United States Patent
Oh et al.

(10) Patent No.: US 11,242,643 B2
(45) Date of Patent: Feb. 8, 2022

(54) ELECTRONIC APPARATUS

(71) Applicant: Samsung Electronics Co., Ltd., Suwon-si (KR)

(72) Inventors: Minhwan Oh, Suwon-si (KR); Jeonghoon Kang, Suwon-si (KR); Eunkyeong Kwak, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 53 days.

(21) Appl. No.: 16/592,295

(22) Filed: Oct. 3, 2019

(65) Prior Publication Data
US 2020/0109508 A1 Apr. 9, 2020

(30) Foreign Application Priority Data
Oct. 4, 2018 (KR) .................... 10-2018-0118068

(51) Int. Cl.
 *D06F 39/12* (2006.01)
 *F16M 7/00* (2006.01)
 *A47B 91/02* (2006.01)

(52) U.S. Cl.
 CPC ............. *D06F 39/125* (2013.01); *F16M 7/00* (2013.01); *A47B 91/024* (2013.01); *F16M 2200/08* (2013.01)

(58) Field of Classification Search
 CPC .... D06F 39/125; F16M 7/00; F16M 2200/08; A47B 91/024; F25D 2323/0011; A47L 15/4253
 USPC ...................................... 248/688, 677, 188.9
 See application file for complete search history.

(56) References Cited

U.S. PATENT DOCUMENTS

| | | | | |
|---|---|---|---|---|
| 3,758,058 A | * | 9/1973 | Neudeck | F16F 15/067 410/46 |
| 5,836,556 A | | 11/1998 | Kim | |
| 7,314,206 B2 | * | 1/2008 | Lee | D06F 39/125 248/655 |
| 8,118,379 B2 | * | 2/2012 | Hong | D06F 39/125 312/351.3 |

(Continued)

FOREIGN PATENT DOCUMENTS

| CN | 106149314 A | 11/2016 |
|---|---|---|
| KR | 10-0234058 | 9/1999 |

(Continued)

OTHER PUBLICATIONS

Extended European Search Report dated Feb. 4, 2020 in European Patent Application No. 19201396.9.

(Continued)

*Primary Examiner* — Muhammad Ijaz
(74) *Attorney, Agent, or Firm* — Staas & Halsey, LLP

(57) ABSTRACT

An electronic apparatus includes a main body including a nut portion; a plurality of level-adjustable foots placed at a lower side of the main body, configured to support the main body, adjustable in height to level the main body, and including a bolt portion inserted in and screw-coupled to the nut portion; and an elastic member configured to elastically press one of the bolt portion and the main body toward the main body or the level-adjustable foot to make a first thread of the bolt portion and a second thread of the nut portion corresponding to the first thread be in contact with each other.

8 Claims, 10 Drawing Sheets

(56) References Cited

U.S. PATENT DOCUMENTS

2005/0116134 A1* 6/2005 Lee ...................... D06F 39/125
248/650

FOREIGN PATENT DOCUMENTS

| KR | 10-2010-0105195 | 7/2010 |
| KR | 10-2015-0045545 | 4/2015 |

OTHER PUBLICATIONS

Office Action dated Nov. 26, 2021, in European Patent Application No. 19201396.9.

* cited by examiner

ELECTRONIC APPARATUS

CROSS-REFERENCE TO RELATED THE APPLICATION

This application is based on and claims priority under 35 U.S.C. § 119 to Korean Patent Application No. 10-2018-0118068 filed Oct. 4, 2018 in the Korean Intellectual Property Office, the disclosure of which is incorporated by reference herein in its entirety.

BACKGROUND

Field

The present disclosure relates to an electronic apparatus such as home appliances with which people easily come into contact in daily life and are used for various purposes, and more particularly to an electronic apparatus having a structure of maintaining an initially adjusted level even with a lapse of time under conditions that vibration is generated by internal or external factors of the apparatus.

Description of the Related Art

Among electronic apparatuses, home appliances with which a user can easily meet are used at home to help the user in many ways in everyday life, and may be actualized by various apparatuses according to what and how it processes. The home appliances are varied in size depending on the types and a relatively big home appliance such as a washing machine, a refrigerator, a dishwasher, a clothing care system, etc. is generally put or installed on a floor.

The home appliances to be put on the floor usually have a structure called a level-adjustable foot, a height-adjustable leg, or the like. A plurality of level-adjustable feet is provided on a bottom of a main body of the home appliance, and supports the main body while spacing the main body from the floor. Use of such a level-adjustable foot has some advantages, for example, of minimizing vibration transferred from the main body to the floor, or preventing heat generated at a lower side of the main body from being directly transferred to the floor.

The level-adjustable foot employs a fastening structure of a bolt and a nut, threads of which match with each other. When a bolt structure of the level-adjustable foot is screw-fastened to a nut structure of the main body, it will be called an engaged state of the level-adjustable foot for convenience. While the level-adjustable foot is in the engaged state, a user can adjust the height of the main body against the floor by rotating the level-adjustable foot forward or backward through a wrench or the like tool. A user adjusts each engaged state of the plurality of level-adjustable feet on the bottom of the main body, thereby ultimately leveling the main body.

However, such an initially leveled home appliance may become askew with a lapse of time. In particular, the leveled state of the washing machine, the dishwasher or the like home appliance, which is relatively violently shaken by a motor, may be askew more seriously and earlier. Because the washing machine employs the motor to rotate a washing tank, in which laundry such as cloth, clothes, a blanket, etc. is accommodated, with a purpose of washing the laundry, the washing machine structurally shakes quite a bit according to the purpose.

There is a gap between the bolt of the level-adjustable foot and the nut of the main body, and thus the level-adjustable foot of a highly-vibrating home appliance is allowed to move within this gap by vibration. Due to repetitive movement, the level-adjustable foot cannot maintain the leveled engaged state. When the initially leveled state becomes askew, vibration and noise a user feels become noticeable no matter how well the home appliance is designed to prepare a countermeasure against the vibration and the noise. Accordingly, various electronic apparatus such as the home appliances need to have a structure for maintaining the initially leveled position of the level-adjustable foot if possible.

SUMMARY

According to an embodiment of the disclosure of the present disclosure, there is provided an electronic apparatus including: a main body including a nut portion; a plurality of level-adjustable foots placed at a lower side of the main body, configured to support the main body, adjustable in height to level the main body, and including a bolt portion inserted in and screw-coupled to the nut portion; and an elastic member configured to elastically press one of the bolt portion and the main body toward the main body or the level-adjustable foot to make a first thread of the bolt portion and a second thread of the nut portion corresponding to the first thread be in contact with each other.

The nut portion may be provided on a bottom side of the main body, the electronic apparatus may further include a support plate to be in contact with an end portion of the bolt portion fastened with the nut portion, and the elastic member may be configured to exert elastic force on the support plate to make the support plate presses the bolt portion toward the level-adjustable foot.

The elastic member may include a first end coupled to the support plate, and a second end coupled to the nut portion.

The elastic member may include a first end coupled to the support plate, and a second end coupled to the bottom side of the main body.

The elastic member may include a coil spring extended being wound around the bolt portion fastened with the nut portion.

The level-adjustable foot may include a base, and the bolt portion extended from the base and standing up toward the main body, and the elastic member may be interposed between the base and the bottom side of the main body and provides elastic force to press the base toward the level-adjustable foot.

The elastic member may include a plurality of first portions coupled to the bottom side of the main body and configured to cover the nut portion, and a second portion extended from the plurality of first portions and configured to press the bolt portion toward the level-adjustable foot while contacting an end portion of the bolt portion.

The elastic member may include a rubber material.

The main body may include a lower plate forming the bottom side and integrated with the nut portion on the bottom side.

The electronic apparatus may further include a locking nut interposed between the bottom side of the main body and the bolt portion, and include a third thread to be engaged with the first thread of the bolt portion.

Elastic force of the elastic member may be set based on contact friction between a first thread of the bolt portion and a second thread of the nut portion and rotary force of the level-adjustable foot at the height adjustment.

BRIEF DESCRIPTION OF THE DRAWINGS

The above and/or other aspects will become apparent and more readily appreciated from the following description of embodiments, taken in conjunction with the accompanying drawings, in which.

DETAILED DESCRIPTION OF EMBODIMENTS

Below, embodiments will be described in detail with reference to accompanying drawings. Further, the embodiments described with reference to the accompanying drawings are not exclusive to each other unless otherwise mentioned, and a plurality of embodiments may be selectively combined within one apparatus. The combination of these plural embodiments may be discretionally selected and applied to realize the present inventive concept by a person having an ordinary skill in the art.

In the description of the embodiments, an ordinal number used in terms such as a first element, a second element, etc. is employed for describing variety of elements, and the terms are used for distinguishing between one element and another element. Therefore, the meanings of the elements are not limited by the terms, and the terms are also used just for explaining the corresponding embodiment without limiting the disclosure.

Further, "at least one" among a plurality of elements in the disclosure represents not only all the elements but also each one of the elements, which excludes the other elements or all combinations of the elements.

Figure 1:
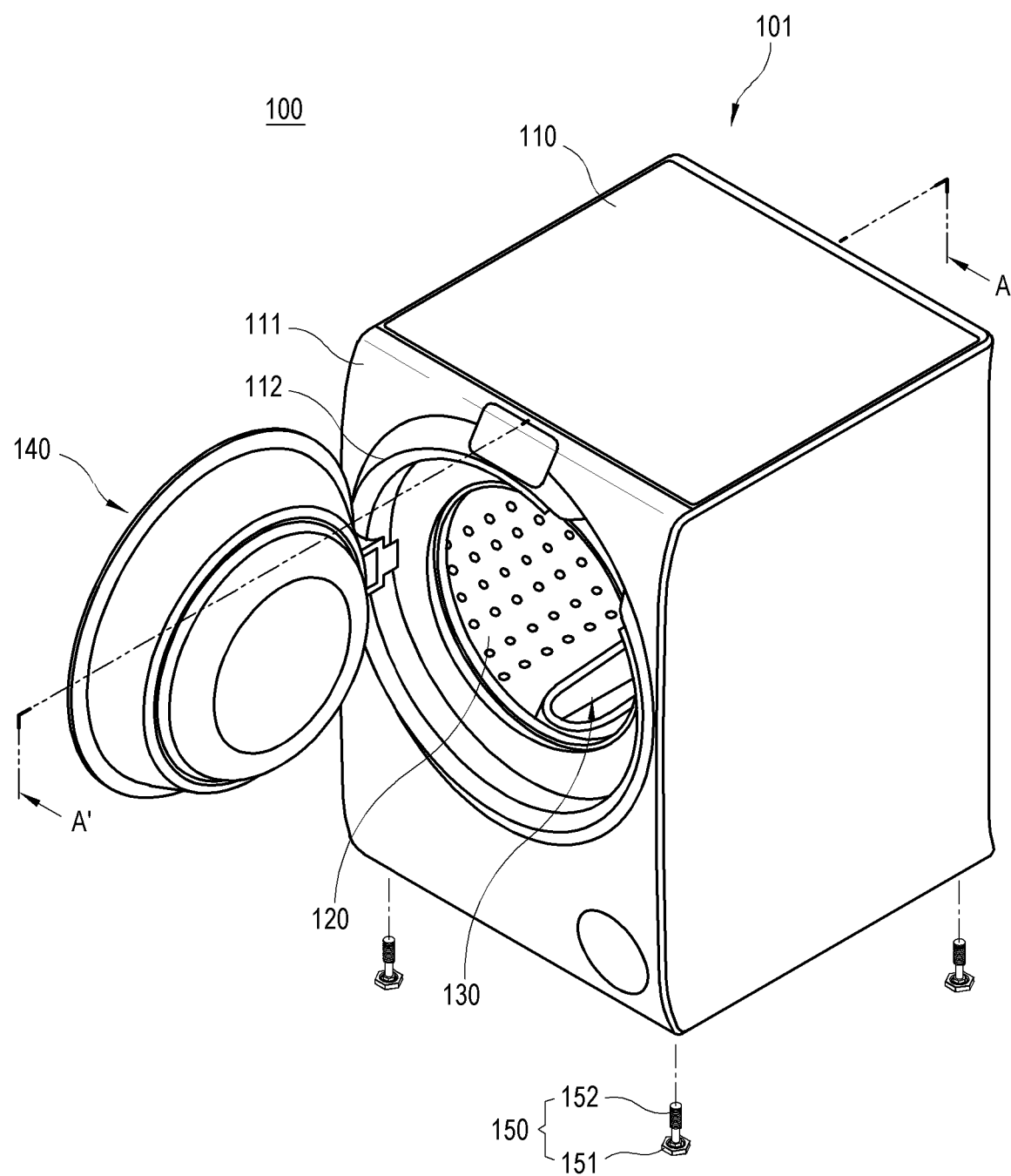
FIG. 1 is a perspective view of a washing machine according to an embodiment of the disclosure.

FIG. 1 is a perspective view of a washing machine according to an embodiment of the disclosure.

As shown in FIG. 1, an electronic apparatus according to this embodiment is actualized by a front-loading washing machine 100. However, the electronic apparatus to which the concept of the disclosure is applied is not limited to only the front-loading washing machine 100, but may include various home appliances such as a top-loading washing machine, a dish washer, a refrigerator, etc. The electronic apparatus may be actualized by one of various home appliances and mechanical equipment to be put on a predetermined installation surface such as a floor, a ground, etc.

The front-loading washing machine 100 includes a housing 110 forming an outer appearance, a washing tank 120 rotatably installed inside the housing 110, one or more lifters 130 protruding from an inner circumference of the washing tank 120 toward a central axis line of the washing tank 120, and a plurality of level-adjustable foots 150 supporting the housing 110 against the installation surface at a lower side of the housing 110.

For convenience, the elements of the front-loading washing machine 100 to be supported by the level-adjustable foot 150, i.e. the elements of the front-loading washing machine 100 other than the level-adjustable foot 150 will be called a main body 101 of the front-loading washing machine 100. In other words, the main body 101 in this embodiment includes general elements of the front-loading washing machine 100 accommodated in or coupled to the housing 110 except the level-adjustable foot 150.

The housing 110 is approximately shaped like a hexahedron, and a front panel 111 of the housing 110 is formed with an entrance 112 via which laundry from the outside is put inside. The housing 110 includes a door 140 coupled to the front panel 111 so as to selectively open and close the entrance 112. The door 140 includes one side hinged upon the front panel 111, and is rotatable between a closed position of closing the entrance 112 and an opened position of opening the entrance 112. Further, the door 140 includes a grip to be gripped by a user when rotating the door 140.

The washing tank 120 rotates with respect to an axial line substantially parallel with the installation surface. Alternatively, the axial line of the washing tank 120 may be inclined at a predetermined angle to a horizontal line. While the washing tank 120 rotates, the lifter 130 hits laundry accommodated in the washing tank 120 upward so that the laundry can be washed by falling impact. Alternatively, the washing tank may rotate with respect to an axial line substantially perpendicular to the installation surface.

The level-adjustable foot 150 spaces the main body 101 of the front-loading washing machine 100 apart from the installation surface, and supports the main body 101 against the installation surface. Not a single but a plurality of level-adjustable foots 150 are installed on the bottom of the main body 101 as being spaced apart from one another. With the level-adjustable foots 150, the bottom of the main body 101 is not in contact with the installation surface, and a space is formed in between the bottom of the main body 101 and the installation surface.

The major functions of the level-adjustable foot 150 are as follows. First, vibration caused by operation of the washing tank 120 is prevented from being directly transferred to the installation surface. Second, heat or the like generated in the main body 101 is prevented from being directly transferred to the installation surface. Third, the main body 101 is leveled even though the installation surface is uneven.

Each of the level-adjustable foots 150 includes a base 151 shaped like a plate to be put on the installation surface, and a bolt portion 152 extended from the base 151 to stand up toward the bottom of the main body 101 and having a thread structure. Overall, the level-adjustable foot 150 looks like an inverted bolt.

A method of leveling the main body 101 is as follows. On the lower side of the housing 110 forming the bottom of the main body 101 is formed a nut portion having a thread structure corresponding to the bolt portion 152. The bolt portion 152 is screwed into the nut portion on the lower side of the housing 110, and for convenience such a state of the level-adjustable foot 150 will be called an engaged state. While the level-adjustable foot 150 is in the engaged state, the bolt portion 152 is rotatable forward or backward. With this rotation control, the height of the level-adjustable foot 150 in the engaged state, i.e. a relative position of the bolt portion 152 against the bottom of the housing 110 is changed.

In other words, when the bolt portion 152 is rotated forward, a distance from the base 151 to the bottom of the housing 110 is relatively decreased. On the other hand, when the bolt portion 152 is rotated backward, a distance from the base 151 to the bottom of the housing 110 is relatively increased.

While the level-adjustable foots 150 are in the engaged state, each height of the level-adjustable foot 150 is adjusted, thereby ultimately leveling the main body 101.

Terms "front," "back," "top," "bottom," "up," "down," etc. used in describing the embodiments of the disclosure are defined with reference to the accompanying drawings, and the shape and position of each element are not restricted by these terms.

Figure 2:
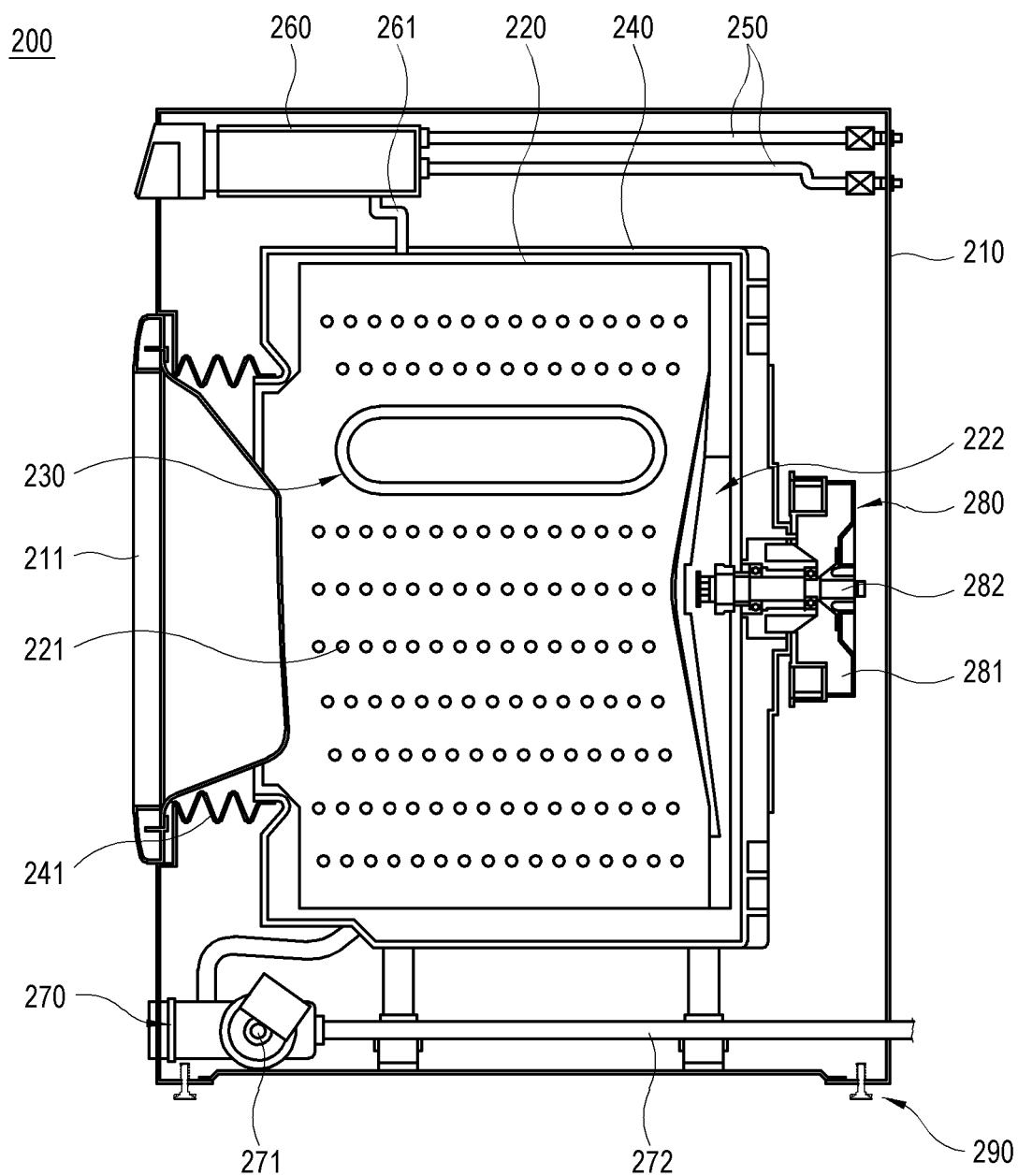
FIG. 2 is a lateral cross-section view of a front-loading washing machine of FIG. 1, taken along line A-A'.

FIG. 2 is a lateral cross-section view of a front-loading washing machine of FIG. 1, taken along line A-A'.

As shown in FIG. 2, a front-loading washing machine 200 includes a housing 210, a washing tank 220, a lifter 230, and a level-adjustable foot 290. The housing 210 includes a door 211 for opening and closing an entrance. Detailed descriptions of these elements will be avoided because they are equivalent to like elements disclosed in the foregoing embodiment.

The front-loading washing machine 200 further includes a tank 240 to be filled with wash water, a feeding pipe 250 to feed the wash water from an external water source such as water supply facilities, a detergent supplier 260 to supply a detergent to the wash water fed through the feeding pipe 250, a drainage 270 to drain the wash water out of the tank 240, and a driver 280 to drive the washing tank 220.

Meanwhile, the washing tank 220 is rotatably provided inside the tank 240, and formed with an entrance on the front thereof. The entrance of the washing tank 220 is disposed corresponding to the entrance of the housing 210, so that laundry put into the entrance of the housing 210 can be accommodated in the washing tank 220. The washing tank 220 includes a plurality of holes 221 formed on the outer circumference thereof so that the wash water can flow in and out through the holes 221. Through the holes 221, the inner space of the washing tank 220 communicates with the inner space of the tank 240. Further, the washing tank 220 includes a rear frame 222 coupled to the driver 280 so that the driver 280 can drive the washing tank 220 to rotate.

The tank 240 accommodates the washing tank 220 therein, and is installed horizontally or at a predetermined angle to a horizontal line inside the housing 210 so as to be filled with the wash water during a washing process. The tank 240 includes the entrance formed on the front side thereof facing the door 211. The tank 240 includes a diaphragm 241 interposed between the entrance of the housing 210 and the entrance of the tank 240. The diaphragm 241 prevents the wash water inside the tank 240 from leaking when the door 211 is in the closed position, and absorbs the displacement and vibration of the tank 240.

The feeding pipe 250 is placed above the tank 240 and provides a channel for supplying the wash water to the tank 240. The feeding pipe 250 includes a first end communicating with the external water source, and a second end communicating with the detergent supplier 260.

The detergent supplier 260 communicates with the tank 240 through a supplying pipe 261. The water supplied through the feeding pipe 250 is mixed with the detergent while passing through the detergent supplier 260, and the water mixed with the detergent is supplied to the tank 240 through the supplying pipe 261. The tank 240 includes a hole to communicate with the feeding pipe 250, and this hole connects with the feeding pipe 250 so that the tank 240 can be filled with the wash water.

The drainage 270 is provided at the lower side of the tank 240 and drains the wash water out of the tank 240 toward the outside of the housing 210. The drainage 270 includes a drainage pump 271 generating pneumatic pressure to discharge the wash water to the outside, and a drainage hose 272 communicating with the drainage pump 271 and providing a channel for the wash water from the inside of the tank 240 toward the outside of the housing 210.

The driver 280 is placed behind the washing tank 220. The driver 280 includes a motor 281 to generate driving force, and a rotary shaft 282 to connect the motor 281 and the rear frame 222 and transfer the driving force from the motor 281 to the washing tank 220. The driving force generated by the forward and backward operation of the motor 281 is transferred to the washing tank 220 through the rotary shaft 282, and the washing tank 220 rotates forward and backward based on the driving force, thereby washing the laundry inside the washing tank 220.

The plurality of level-adjustable foots 290 are respectively fastened to the bottom of the housing 210. The level-adjustable foots 290 may be adjusted to have the same height or different heights according to the evenness of the installation surface. In result, each height of the level-adjustable foot 290 is controlled to maintain the leveled state of the front-loading washing machine 200.

Below, the structure of the level-adjustable foot 290 according to an embodiment will be described in detail. To level the front-loading washing machine 200, the plurality of level-adjustable foots 290 spaced apart from one another are used. Here, the level-adjustable foots 290 have substantially the same structure and fastening method. Therefore, only one level-adjustable foot 290 will be representatively described below in the following embodiment.

Figure 3:
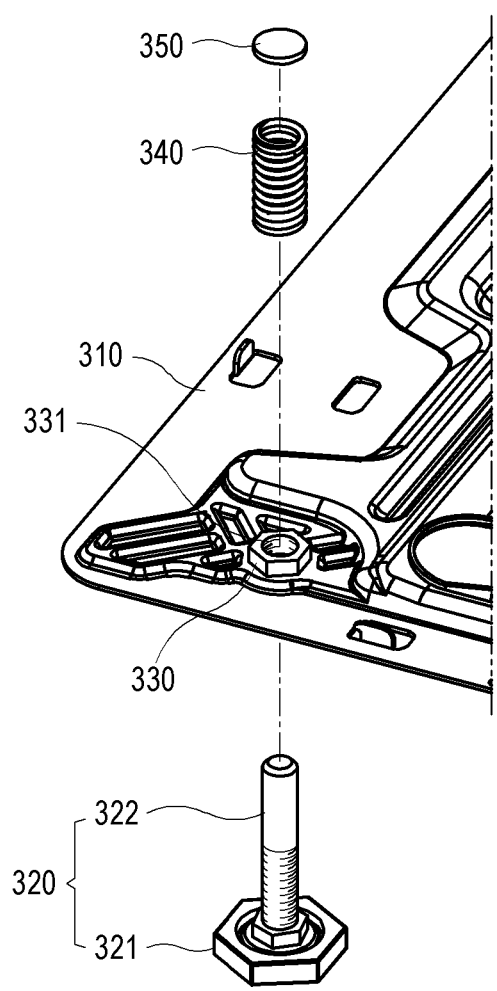
FIG. 3 is a partial exploded perspective view of a front-loading washing machine according to an embodiment of the disclosure to which a level-adjustable foot is coupled.

FIG. 3 is a partial exploded perspective view of a front-loading washing machine according to an embodiment of the disclosure to which a level-adjustable foot is coupled.

As shown in FIG. 3, a front-loading washing machine according to this embodiment has a lower plate 310 forming a bottom of a housing. The lower plate 310 has a top surface facing the inside of the housing, and a bottom surface facing an installation surface. The lower plate 310 has a housing hole through which a bolt portion 322 of a level-adjustable foot 320 passes.

The level-adjustable foot 320 includes a base 321 to be put on the installation surface, and the bolt portion 322 extended from the base 321 and standing up toward the bottom of the main body 101.

The bottom surface of the base 321 is in contact with the installation surface, and the top surface of the base 321 faces toward the bottom surface of the lower plate 310. The base 321 may be made of metallic, plastic, ceramic or the like material which is hard enough to support the bolt portion 322, and may additionally include a portion made of rubber or the like vibration-absorbing material to be in contact with the installation surface and absorb vibration and noise.

The bolt portion 322 has a cylindrical shape having a predetermined length. The bolt portion 322 has a thread on the outer circumferential surface forming a lateral side in a radial direction. The bolt portion 322 has a diameter smaller than the diameter of the housing hole in order to at least pass through the housing hole.

Below, the structure of the main body in the front-loading washing machine to fasten the level-adjustable foot 320 to the lower plate 310 will be described. The main body includes a nut portion 330, an elastic member 340, and a support plate 350.

The nut portion 330 is put on the top surface of the lower plate 310. The top side of nut portion 330 faces toward the inside of the housing, and the bottom side of the nut portion 330 is in contact with the top surface of the lower plate 310. The nut portion 330 has a fastening hole 331 having a thread on an inner circumference thereof, and couples with the lower plate 310 at a position where the fastening hole 331 is aligned with the housing hole. The nut portion 330 and the lower plate 310 may be coupled by welding, bonding or the like strong coupling method. Thus, the bolt portion 322 is allowed to pass through the housing hole and the fastening hole 331.

For convenience, the thread of the bolt portion 322 will be called a first thread, and the thread of the nut portion 330 will be called a second thread. The first thread and the second thread are shaped corresponding to each other for screw-coupling. The housing hole in this embodiment does not have a thread. However, the housing hole of the lower plate 310 may be alternatively designed to have a thread corresponding to the first thread The elastic member 340 is interposed between the nut portion 330 and the support plate 350. The elastic member 340 includes a first end coupled to the nut portion 330, and a second end coupled to the support plate 350. In this embodiment, the elastic member 340 is a coil spring. However, besides the coil spring, various elastic members such as a flat spring, etc. may be applied to the present structure. In this embodiment, the elastic member 340 is actualized by a single coil spring extended being wound around the bolt portion 322 fastened with the nut portion 330. However, the elastic member 340 may be actualized by a plurality of coil springs respectively disposed around the bolt portions 322.

Further, the elastic member 340 serves to support the support plate 350. The support plate 350 is disposed above the elastic member 340 as coupled to the elastic member 340 in substantially parallel with the lower plate 310. The support plate 350 has a bottom side facing the nut portion 330, and a top side facing toward the inside of the housing. The support plate 350 is disposed at a position corresponding to at least the housing hole, so that the bottom side of the support plate 350 can cover an end portion of the bolt portion 322 when the bolt portion 322 is fastened to the nut portion 330.

With this structure, the bolt portion 322 is screw-coupled to the nut portion 330 through the housing hole, so that the level-adjustable foot 320 can be engaged with the main body. In this state, the bolt portion 322 is rotated forward or backward by a user, thereby finely controlling the height of the level-adjustable foot 320. When the level-adjustable foot 320 is leveled in the state that the end portion of the bolt portion 322 is in contact with the bottom side of the support plate 350, the elastic member 340 exerts a repulsive force against the force of the bolt portion 322 pushing the support plate 350. In other words, the repulsive force to the elastic member 340 is exerted on the bolt portion 322 in the opposite direction to the pushing force of the bolt portion 322. Therefore, the first thread of the bolt portion 322 and the second thread of the nut portion 330 are more strongly and continuously in contact with each other, thereby having an effect on increasing friction.

Meanwhile, the foregoing embodiment describes that the elastic member 340 has the first end coupled to the nut portion 330 and the second end coupled to the support plate 350. However, the support type of the elastic member 340 or the support plate 350 is not limited to this embodiment.

For example, in the state that the elastic member is interposed between the support plate and the nut portion while surrounding the bolt portion, the support plate may be coupled to an end portion of the bolt portion. To couple the support plate and the bolt portion, there may be various methods, for example, the support plate may be fitted or welded to the bolt portion, the support plate and the bolt portion are respectively formed with hook structures and hooked to each other, and so on. With this structure, the elastic member is not separated from but supported on the support plate and the nut portion even though the elastic member is not coupled to the nut portion or the support plate.

Figure 4:
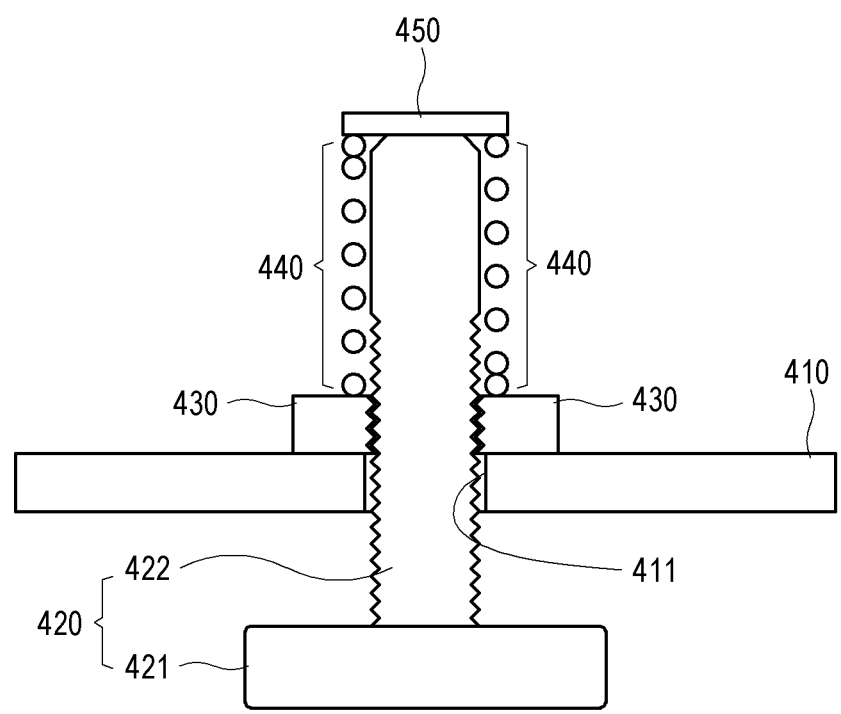
FIG. 4 is a partial lateral cross-section view of illustrating that the level-adjustable foot of FIG. 3 is coupled to a bottom of a housing.

FIG. 4 is a partial lateral cross-section view of illustrating that the level-adjustable foot of FIG. 3 is coupled to a bottom of a housing.

As shown in FIG. 4, the front-loading washing machine according to this embodiment includes a lower plate 410, a housing hole 411, a level-adjustable foot 420, a nut portion 430, an elastic member 440, and a support plate 450. The level-adjustable foot 420 includes a base 421, and a bolt portion 422. Detailed descriptions of these elements will be avoided because they are equivalent to like elements disclosed in the foregoing embodiments.

The bolt portion 422 is fastened with the nut portion 430 via the housing hole 411, and adjusted in level to have a proper height. For convenience, such a height-controlled state of the bolt portion 422 will be called a rest position of the level-adjustable foot 420 or the bolt portion 422.

When control is performed to make the bolt portion 422 pass through the housing hole 411 and be fastened with the nut portion 430, the bolt portion 422 pushes the support plate 450 upward. Because the elastic member 440 is coupled between the support plate 450 and the nut portion 430, elastic force of the elastic member 440 is exerted on the support plate 450 and the nut portion 430, thereby generating repulsive force of the support plate 450 pushing the bolt portion 422 downward and pushing the nut portion 430 upward. This repulsive force makes strong contact and continues to maintain friction between the first thread of the bolt portion 422 and the second thread of the nut portion 430, thereby making the bolt portion 422 keep the rest position even though vibration or the like occurs.

In terms of the generation of the repulsive force, it is more advantageous to make the level-adjustable foot 420 maintain the rest position as the elastic coefficient of the elastic member 440 becomes higher. However, when the elastic coefficient is excessively high, more force is required to fasten the bolt portion 422 with the nut portion 430 or control the level. Therefore, the elastic coefficient of the elastic member 440 has to be properly set considering all of these two factors. For example, a relationship between rotary force for rotating the level-adjustable foot 420 and normal force exerted in an axial direction of the level-adjustable foot 420 may be derived based on the following expression.

$$T=Q\{(d/2)*\tan(a+b)+1.4*(d/2)*u\}$$

where, T is rotary force, Q is normal force, a is a lead angle, b is a frictional angle, d is an effective diameter, and u is a frictional coefficient. Further, "*" refers to a multiplication symbol, and "tan" refers to a tangent function.

According to an embodiment, a large-capacity front-loading washing machine needs a rotary force of about 100 N to 140 N to rotate the level-adjustable foot 420, and thus a normal force generated corresponding to the rotary force ranges from about 42 N to 60 N. When a user's work is taken into account for the installation of the level-adjustable foots 420, it is proper that the maximum normal force is not greater than 100 N, and thus the elastic coefficient of the elastic member 440 ranges from about 1.0 to 1.3 N/mm. However, such a numerical value may be varied depending on characteristics and conditions of an apparatus. Therefore, specific values are not essential for an apparatus to which the concept of the disclosure is applied.

The support plate 450 has to withstand the normal force generated in the elastic member 440. When the maximum normal force generated in the elastic member 440 is about 100 N, the support plate 450 made of steel has to be thicker than at least 1.0 mm. When the support plate 450 is too thin to withstand the maximum normal force of the elastic member 440, the support plate 450 is bent by the elastic force of the elastic member 440. Further, when it is taken into account that the elastic member 440 has to be stably supported on and not to be separated from the support plate 450, the support plate 450 may have a thickness of about 3.0 mm, which is merely an example.

With the repulsive force exerted by the elastic force of the elastic member 440, the first thread of the bolt portion 422 more strongly contacts the second thread of the nut portion 430, thereby increasing friction between the bolt portion 422 and the nut portion 430. Due to the increased friction, the rest position of the level-adjustable foot 420 is maintained. Below, a contact structure between the bolt portion 422 and the nut portion 430 based on the repulsive force of the elastic member 440 will be described in detail.

Figure 5:
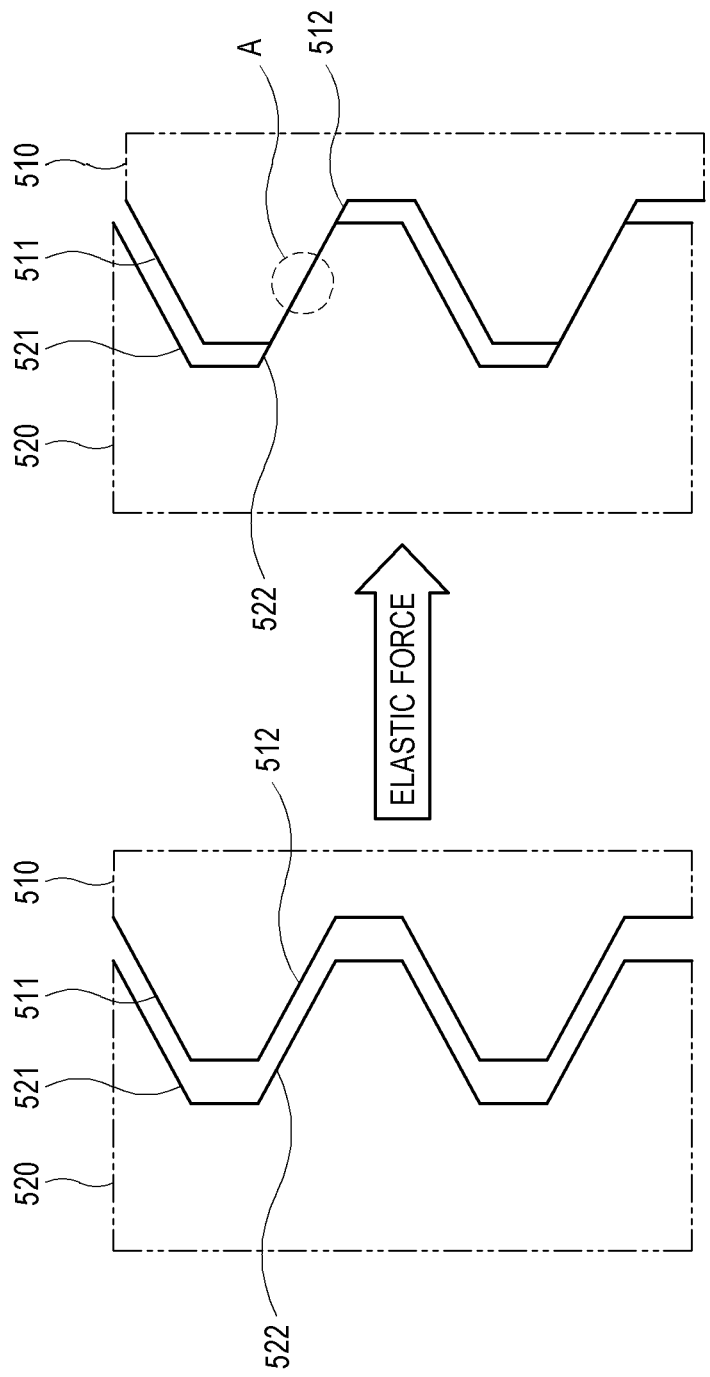
FIG. 5 is an enlarged partial lateral cross-section view of illustrating a space between a bolt portion and a nut portion in the coupled state of FIG. 4.

FIG. 5 is an enlarged partial lateral cross-section view of illustrating a space between a bolt portion and a nut portion in the coupled state of FIG. 4.

As shown in FIG. 5, a bolt portion 510 includes a first thread having a first bolt helicoidal surface 511 substantially inclined at a first angle, and a second bolt helicoidal surface 512 substantially inclined at a second angle. The first thread of the bolt portion 510 is formed as the first bolt helicoidal surface 511 and the second bolt helicoidal surface 512 are alternately disposed. Here, the first angle and the second angle may for example refer to angles to a lengthwise axial line of the bolt portion 510. However, there are no limits to the reference for the angles.

Likewise, a nut portion 520 includes a second thread having a first nut helicoidal surface 521 substantially inclined at the first angle, and a second nut helicoidal surface 522 substantially inclined at the second angle. The second thread of the nut portion 520 is formed as the first nut helicoidal surface 521 and the second nut helicoidal surface 522 are alternately disposed. The first bolt helicoidal surface 511 and the first nut helicoidal surface 521 are extended in substantially parallel with each other, and the second bolt helicoidal surface 512 and the second nut helicoidal surface 522 are extended in substantially parallel with each other.

In FIG. 5, the left shows that the repulsive force based on the elastic force of the elastic member is not given, and the right shows that the repulsive force is given based on the elastic force of the elastic member.

When the repulsive force of the elastic member is not exerted, a first space is made between the first bolt helicoidal surface 511 and the first nut helicoidal surface 521 facing with each other and a second space is made between the second bolt helicoidal surface 512 and the second nut helicoidal surface 522 facing with each other. In other words, the space formed between the bolt portion 510 and the nut portion 520 makes the bolt portion 510 deviate from the nut portion 520 without keeping the rest position when vibration occurs.

On the other hand, when the repulsive force of the elastic member is exerted based on the structure according to an embodiment of the disclosure, the first space is present between the first bolt helicoidal surface 511 and the first nut helicoidal surface 521 facing with each other. However, as shown in "A" in FIG. 5, the second bolt helicoidal surface 512 and the second nut helicoidal surface 522 facing with each other are in contact with each other, thereby removing the second space between the second bolt helicoidal surface 512 and the second nut helicoidal surface 522.

In other words, on the contrary to the case where the repulsive force of the elastic member is not exerted, according to an embodiment of the disclosure, the space is relatively decreased between the bolt portion 510 and the nut portion 520, and a contact area is relatively increased between the bolt portion 510 and the nut portion 520. Therefore, friction between the bolt portion 510 and the nut portion 520 is relatively improved so that the bolt portion 510 can keep the rest position more firmly.

In this embodiment, the elastic member is employed to make contact between the second bolt helicoidal surface 512 and the second nut helicoidal surface 522. Alternatively, the elastic member may be used to make contact between the first bolt helicoidal surface 511 and the first nut helicoidal surface 521 to thereby achieve the effects according to an embodiment of the disclosure.

In brief, the front-loading washing machine according to an embodiment of the disclosure exerts the elastic force of the elastic member toward the main body or the level-adjustable foot so that the first thread of the bolt portion 510 of the level-adjustable foot can more firmly contact the second thread of the nut portion 520 when the level of the main body is controlled by fastening the level-adjustable foot to the main body. Thus, the level-adjustable foot is kept without deviating from the initial position even though the front-loading washing machine shakes. In addition, the level-adjustable foot is prevented from being loosened from the main body, thereby suppressing vibration and noise in the front-loading washing machine.

Meanwhile, the foregoing embodiments describe the structure that the elastic member is coupled to each of the nut portion and the support plate. However, the elastic member may alternatively coupled to each of the lower plate and the support plate. In this regard, an embodiment will be described below.

Figure 6:
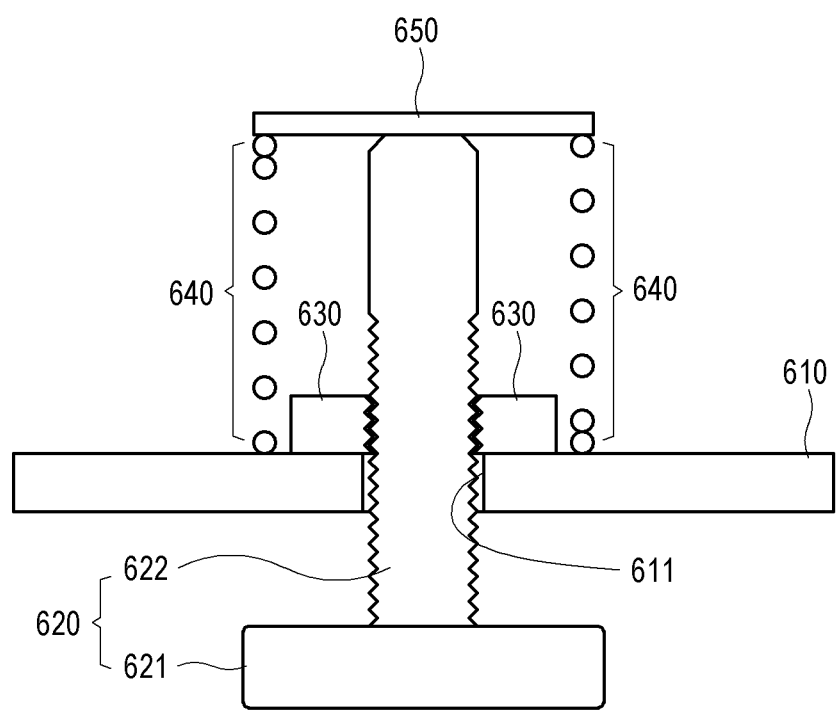
FIG. 6 is a partial lateral cross-section view of illustrating that a level-adjustable foot in a front-loading washing machine according to an embodiment of the disclosure is coupled to a lower plate of a housing.

FIG. 6 is a partial lateral cross-section view of illustrating that a level-adjustable foot in a front-loading washing machine according to an embodiment of the disclosure is coupled to a lower plate of a housing.

As shown in FIG. 6, a front-loading washing machine according to this embodiment includes a lower plate 610 of a housing, a level-adjustable foot 620, a nut portion 630, an elastic member 640, and a support plate 650. The lower plate 610 is formed with a housing hole 611. The level-adjustable foot 620 includes a base 621, and a bolt portion 622. Detailed descriptions of these elements will be avoided because they are equivalent to like elements disclosed in the foregoing embodiment.

This embodiment is different from the foregoing embodiment in the structure of installing the elastic member 640. The elastic member 640 is interposed between the lower plate 610 and the support plate 650. The elastic member 640 has a first end coupled to the top side of the lower plate 610, and a second end coupled to the bottom side of the support plate 650. Alternatively, the support plate 650 may have a groove on one side thereof, and the elastic member 640 may be coupled to the support plate 650 as accommodated in this groove.

When the bolt portion 622 is fastened with the nut portion 630 via the housing hole 611 and an end portion of the bolt portion 622 becomes in contact with the bottom side of the support plate 650, the bolt portion 622 pushes the support plate 650 upward. Because the elastic member 640 is coupled between the support plate 650 and the lower plate 610, the elastic force of the elastic member 640 is exerted on the support plate 650 and the lower plate 610, thereby keeping the rest position of the bolt portion 622.

In this embodiment, the elastic member 640 is coupled to not the nut portion 630 but the lower plate 610. Because the elastic member 640 is disposed outside the nut portion 630, the elastic member 640 may have a relatively large diameter. Further, there are no needs of placing the elastic member 640 on a relatively narrow top side of the nut portion 630, and therefore the elastic member 640 in this embodiment is more stably placed.

Meanwhile, the foregoing embodiments describe that the elastic member actualized by the coil spring and the support plate made of a metallic material are used to generate the repulsive force. However, the concept of the disclosure is not limited to these embodiments. In this regard, an embodiment of another structure for generating the repulsive force will be described.

Figure 7:
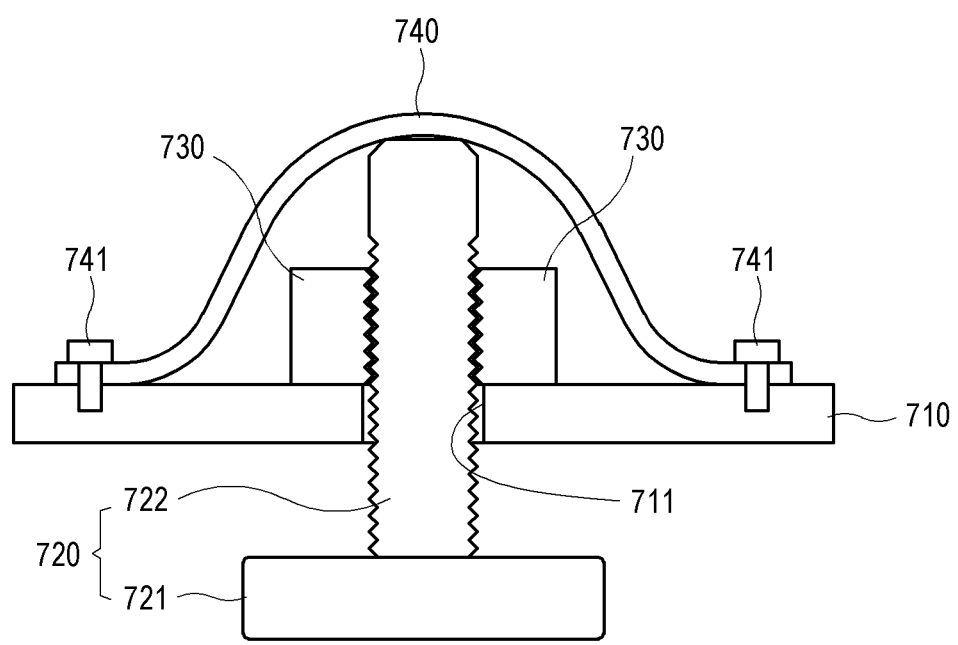
FIG. 7 is a partial lateral cross-section view of illustrating a dome that exerts repulsive force against a level-adjustable foot in a front-loading washing machine according to an embodiment of the disclosure.

FIG. 7 is a partial lateral cross-section view of illustrating a dome that exerts repulsive force against a level-adjustable foot in a front-loading washing machine according to an embodiment of the disclosure.

As shown in FIG. 7, a front-loading washing machine in this embodiment includes a lower plate 710 of a housing, a level-adjustable foot 720, and a nut portion 730. The lower plate 710 is formed with a housing hole 711. The level-adjustable foot 720 includes a base 721, and a bolt portion 722. Detailed descriptions of these elements will be avoided because they are equivalent to like elements disclosed in the foregoing embodiment.

This embodiment is different from the foregoing embodiment in that a dome 740 of an elastic material such as rubber is configured to generate the repulsive force. The dome 740 is disposed on the top side of the lower plate 710 while covering the housing hole 711 and the nut portion 730. The dome 740 is coupled to the top side of the lower plate 710 by a coupling member 741 such as a screw, a rivet, a hook, adhesive, etc.

When the bolt portion 722 is fastened with the nut portion 730 via the housing hole 711, an end portion of the bolt portion 722 pushes the bottom side of the dome 740 upward. The elasticity of the dome 740 is exerted on the bolt portion 722 and the lower plate 710, so that the first thread of the bolt portion 722 can more firmly contact the second thread of the nut portion 730. This structure has substantially the same effects as those of the foregoing embodiments.

Meanwhile, in the foregoing embodiments, the elastic member is interposed between the nut portion and the support plate inside the housing. Alternatively, the elastic member may be placed outside the housing. In this regard, an embodiment will be described below.

Figure 8:
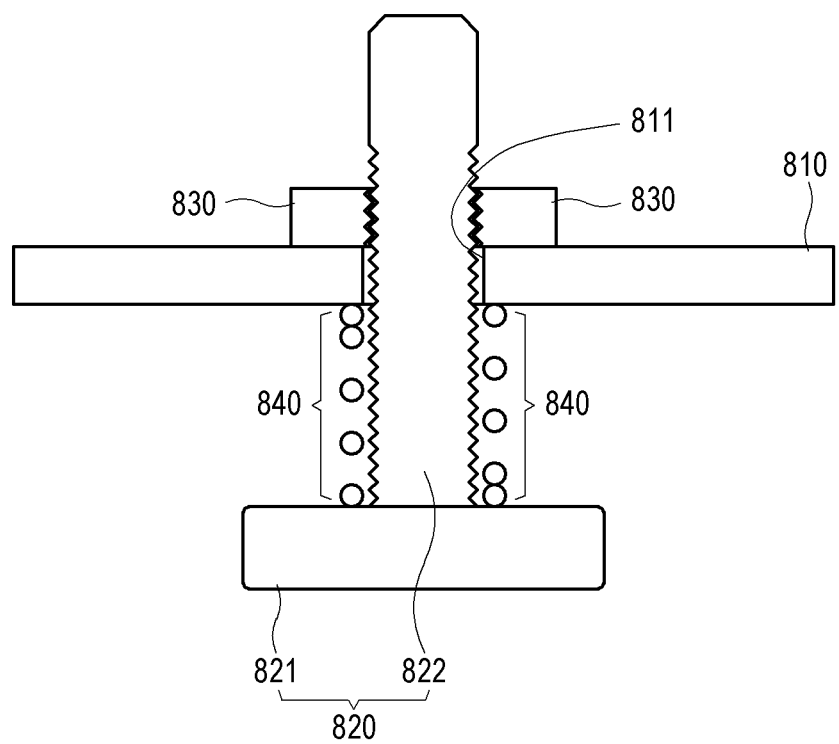
FIG. 8 is a partial lateral cross-section view of illustrating that an elastic member is installed outside a housing in a front-loading washing machine according to an embodiment of the disclosure.

FIG. 8 is a partial lateral cross-section view of illustrating that an elastic member is installed outside a housing in a front-loading washing machine according to an embodiment of the disclosure.

As shown in FIG. 8, a front-loading washing machine according to this embodiment includes a lower plate 810, a housing hole 811, a level-adjustable foot 820, and a nut portion 830. The level-adjustable foot 820 includes a base 821 and a bolt portion 822. Detailed descriptions of these elements will be avoided because they are equivalent to like elements disclosed in the foregoing embodiment.

This embodiment is different from the foregoing embodiment in an installation structure of an elastic member 840. In the foregoing embodiments, the elastic member is disposed between the nut portion on the lower plate and the support plate. On the other hand, according to this embodiment, the elastic member 840 is interposed between the lower plate 810 and the base 821.

The elastic member 840 is disposed around the bolt portion 822, and the bolt portion 822 is fastened with the nut portion 830 via the housing hole 811. While the bolt portion 822 pushes the main body upward, the elastic force of the elastic member 840 is exerted on the lower plate 810 and the base 821 unlike those of the foregoing embodiments. The elastic member 840 pushes the lower plate 810 and the nut portion 830 upward so that the nut portion 830 and the bolt portion 822 can be more firmly in contact with each other.

Meanwhile, the foregoing embodiments describe that the nut portion and the lower plate are individually provided and coupled to each other by welding. However, the nut portion and the lower plate may be provided as a single body, that is, the housing hole of the lower plate may internally have a thread corresponding to the bolt portion instead of a separate nut portion. In this regard, an embodiment will be described below.

Figure 9:
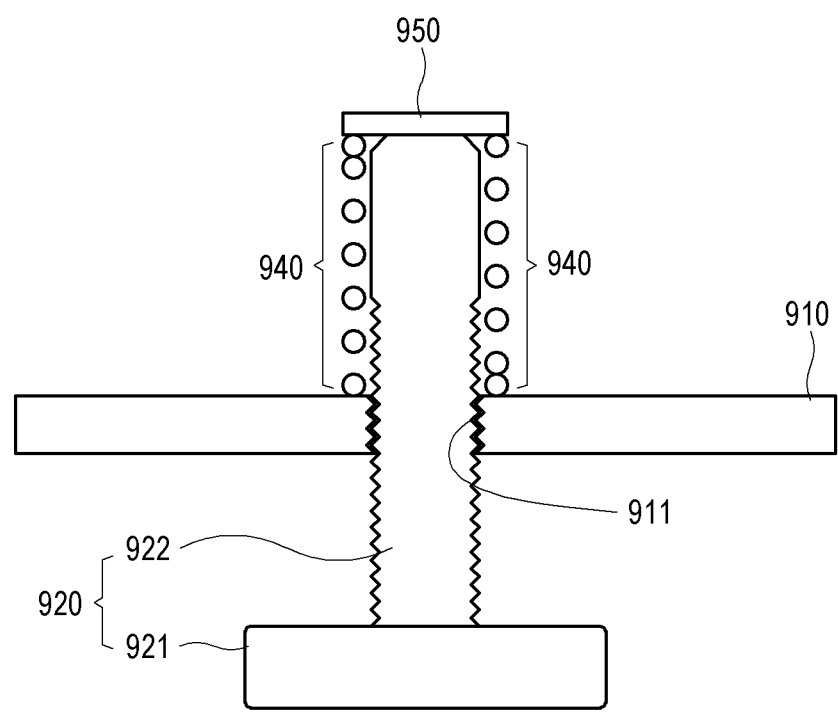
FIG. 9 is a partial lateral cross-section view of illustrating that a bolt portion is coupled when a housing hole of a lower plate is internally formed with a thread in a front-loading washing machine according to an embodiment of the disclosure.

FIG. 9 is a partial lateral cross-section view of illustrating that a bolt portion is coupled when a housing hole of a lower plate is internally formed with a thread in a front-loading washing machine according to an embodiment of the disclosure.

As shown in FIG. 9, a front-loading washing machine in this embodiment includes a lower plate 910 of a housing, a level-adjustable foot 920, an elastic member 940, and a support plate 950. The level-adjustable foot 920 includes a base 921, and a bolt portion 922. Detailed descriptions of these elements will be avoided because they are equivalent to like elements disclosed in the foregoing embodiment.

This embodiment is different from the foregoing embodiment in that, instead of the nut portion of the foregoing embodiments, a thread corresponding to the bolt portion 922 is formed on an inner circumference of a housing hole 911 of a lower plate 910. This structure is possible when the lower plate 910 is thick enough to fasten with the bolt portion 922. In this embodiment, the elastic member 940 is interposed between the lower plate 910 and the support plate 950. The elastic member 940 has a first end coupled to the top side of the lower plate 910, and a second end coupled to the bottom side of the support plate 950.

The bolt portion 922 is screw-coupled to the housing hole 911. The first thread of the bolt portion 922 and the second thread of the housing hole 911 are engaged with each other, and an end portion of the bolt portion 922 pushes the bottom side of the support plate 950 upward. To this end, the elastic force of the elastic member 940 is exerted on the bolt portion 922 and the lower plate 910. Thus, the first thread of the bolt portion 922 more strongly contacts the second thread of the housing hole 911, thereby increasing friction.

Meanwhile, the foregoing embodiments describe that the elastic member is used to keep the rest position of the level-adjustable foot. To keep the rest position of the level-adjustable foot, an additional element may be provided. In this regard, an embodiment will be described below.

Figure 10:
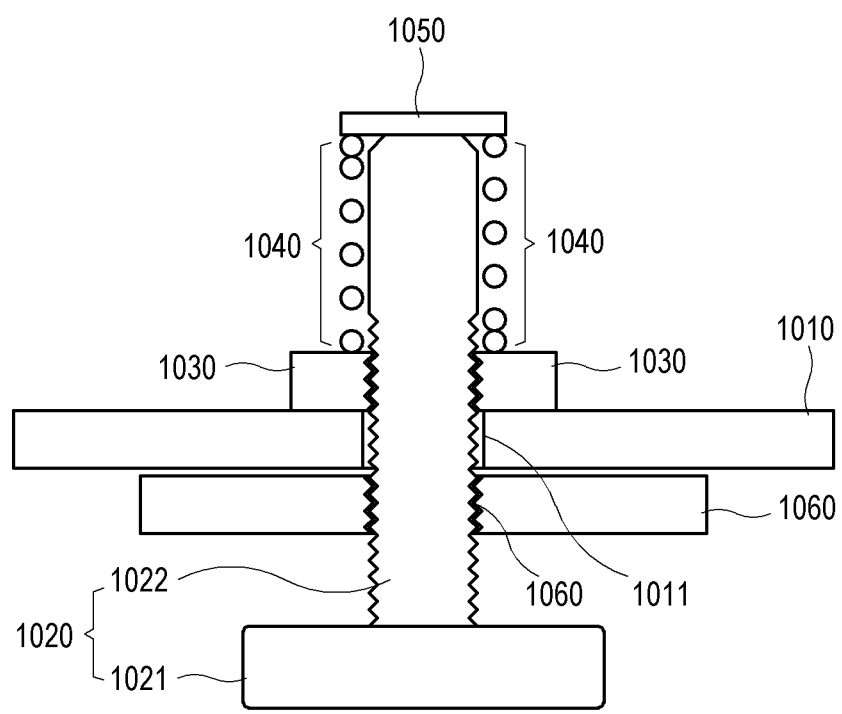
FIG. 10 is a partial lateral cross-section view of illustrating that a locking nut is additionally applied in a state that the level-adjustable foot of FIG. 4 is coupled to a lower plate of a housing.

FIG. 10 is a partial lateral cross-section view of illustrating that a locking nut is additionally applied in a state that the level-adjustable foot of FIG. 4 is coupled to a lower plate of a housing.

As shown in FIG. 10, a front-loading washing machine according to this embodiment includes a lower plate 1010, a housing hole 1011, a level-adjustable foot 1020, a nut portion 1030, an elastic member 1040, and a support plate 1050. The level-adjustable foot 1020 includes a base 1021 and a bolt portion 1022. Detailed descriptions of these elements will be avoided because they are equivalent to like elements disclosed in the foregoing embodiment.

According to this embodiment, a locking nut 1060 is additionally applied to the structure of the foregoing embodiment described with reference to FIG. 4. The locking nut 1060 includes a locking nut hole 1061 through which the bolt portion 1022 passes, and an inner circumference of the locking nut hole 1061 has a third thread corresponding to the first thread of the bolt portion 1022 so as to screw-couple with the bolt portion 1022.

With this structure, a method of installing the level-adjustable foot 1020 is as follows. First, the bolt portion 1022 is inserted in the locking nut hole 1061 and controlled to make an end portion of the bolt portion 1022 protrude upward beyond the locking nut hole 1061 by a predetermined length. In this state, the end portion of the bolt portion 1022 penetrates the housing hole 1011 and is then fastened with the nut portion 1030, so that the bolt portion 1022 can be rotated forward and backward to have a proper height, thereby controlling the height of the bolt portion 1022. In this case, the locking nut 1060 is placed between the lower plate 1010 and the base 1021.

When the bolt portion 1022 is in the rest position by controlling the height of the bolt portion 1022, the locking nut 1060 is rotated to make the top side of the locking nut 1060 be in contact with the bottom side of the lower plate 1010 and push the lower plate 1010. In this case, the first thread of the bolt portion 1022 is in contact with the third thread of the locking nut 1060. Therefore, the rotation of the bolt portion 1022 is further stopped by the locking nut 1060 in addition to the elastic force of the elastic member 1040 pushing the bolt portion 1022 downward, thereby making the bolt portion 1022 more firmly keep the rest position.

Although a few embodiments have been shown and described, it will be appreciated by those skilled in the art that changes may be made in these embodiments without departing from the principles and spirit of the invention, the scope of which is defined in the appended claims and their equivalents.

What is claimed is:

1. An electronic apparatus comprising:
a main body comprising a lower plate forming a bottom of the main body;
a support plate above the lower plate;
a nut portion having a screw coupling thread and being provided at a top surface of the lower plate and between the lower plate and the support plate;
a level-adjustable foot at a lower side of the main body to support the main body, being adjustable in height to level the main body, and comprising a bolt portion having a screw coupling thread and being screw-coupled to the nut portion via engagement of the screw coupling thread of the nut portion and the screw coupling thread of the bolt portion so that an end of the bolt portion is contactable with the support plate to press the support plate without passing through the support plate; and
an elastic member contacting the support plate and either the nut portion or the lower plate, so as to generate a repulsive force in response to the bolt portion being screw-coupled to the nut portion and the bolt portion pressing the support plate, to thereby increase contact between the screw coupling thread of the bolt portion and the screw coupling thread of the nut portion.

2. The electronic apparatus according to claim 1, wherein the elastic member comprises a first end coupled to the support plate so as to contact the support plate, and a second end coupled to the nut portion so as to contact the nut portion.

3. The electronic apparatus according to claim 1, wherein the elastic member comprises a first end coupled to the support plate so as to contact the support plate, and a second end coupled to the lower plate so as to contact the lower plate.

4. The electronic apparatus according to claim 1, wherein the elastic member comprises a coil spring wound around the bolt portion.

5. The electronic apparatus according to claim 1, wherein the lower plate is integrated with the nut portion.

6. The electronic apparatus according to claim 1, further comprising a locking nut interposed between the lower plate and the bolt portion, and comprising a screw coupling thread to be engaged with the screw coupling thread of the bolt portion.

7. An electronic apparatus comprising:
a main body comprising a lower plate forming a bottom of the main body;
a nut portion having a screw coupling thread and being provided at a top surface of the lower plate;
a level-adjustable foot at a lower side of the main body to support the main body, being adjustable in height to level the main body, and comprising a bolt portion having a screw coupling thread and being screw-coupled to the nut portion via engagement of the screw coupling thread of the nut portion and the screw coupling thread of the bolt portion; and
an elastic member forming a dome shape and being coupled to the lower plate with the dome shape extended from the lower plate to cover the bolt portion so that an end of the bolt portion is contactable with the elastic member to press the elastic member without passing through the elastic member,
wherein the elastic member is configured to generate a repulsive force in response to the bolt portion being screw-coupled to the nut portion and the bolt portion pressing the elastic member, to thereby increase contact between the screw coupling thread of the bolt portion and the screw coupling thread of the nut portion.

8. The electronic apparatus according to claim 7, wherein the elastic member comprises a rubber material.

* * * * *